United States Patent [19]

Stewart

[11] 3,748,925

[45] July 31, 1973

[54] CRANKSHAFT BALANCE WEIGHTS AND METHOD OF ASSEMBLY

[75] Inventor: William F. Stewart, Peterborough, England

[73] Assignee: Perkins Engines Limited, Peterborough, England

[22] Filed: Mar. 11, 1971

[21] Appl. No.: 123,461

Related U.S. Application Data

[62] Division of Ser. No. 26,922, April 9, 1970, Pat. No. 3,673,651.

[52] U.S. Cl. .................................... 74/603, 74/597
[51] Int. Cl. .............................................. F16c 3/20
[58] Field of Search .............................. 74/603, 597

[56] References Cited
UNITED STATES PATENTS

| | | | |
|---|---|---|---|
| 1,165,861 | 12/1915 | Fekete | 74/603 |
| 1,255,409 | 2/1918 | Gordon | 74/603 |
| 1,261,053 | 4/1918 | O'Brien | 74/603 |

FOREIGN PATENTS OR APPLICATIONS

| | | | |
|---|---|---|---|
| 431,712 | 7/1935 | Great Britain | 74/603 |
| 431,585 | 7/1935 | Great Britain | 74/603 |

*Primary Examiner*—Charles J. Myhre
*Assistant Examiner*—F. D. Shoemaker
*Attorney*—Gerhardt, Greenlee & Farris

[57] ABSTRACT

A crankshaft is formed with stub web portions for attachment of balance weights. The crankshaft bearing surfaces are ground and then the weights are electron beam welded to the web portions, which have a stepped configuration to enable indexing for sequential weight welding. After hardening trimmer plates are fastened to the weights axially of the crankshaft to complete the balancing. This provides an inexpensive, easily machined, accurately balanced crankshaft.

1 Claim, 11 Drawing Figures

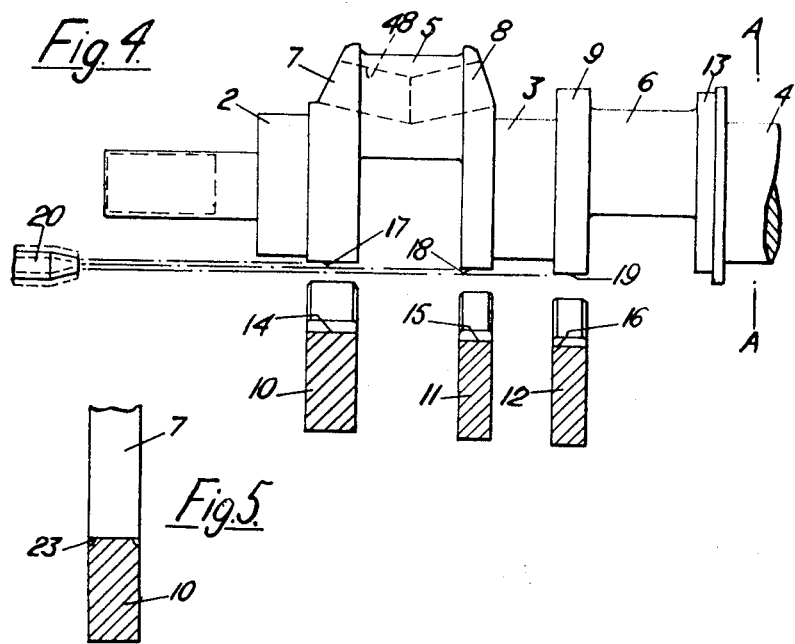
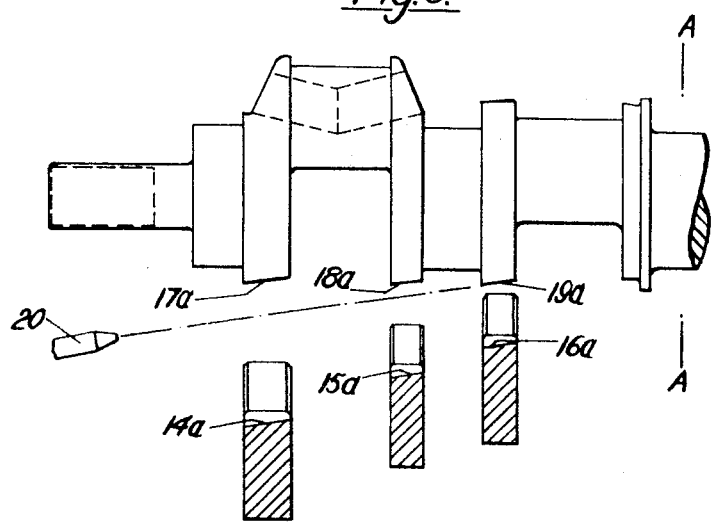

CRANKSHAFT BALANCE WEIGHTS AND METHOD OF ASSEMBLY

This application is a division of U. S. Pat. application No. 26,922, filed Apr. 9, 1970 now U.S. Pat. No. 3,673,651.

The present invention relates to crankshafts for engines and to a method of making crankshafts.

Hitherto it has been the practice to use balance weights on engine crankshafts to reduce vibration and to reduce bearing loads.

Balance weights may be formed as an integral part of the crankshaft or separate weights may be attached after forming the crankshaft. Crankshafts for production engines for automotive and other applications usually undergo tests at rotational speeds well in excess of those they would encounter during normal running of the engine. Under the test conditions the balance weights must remain firmly attached to the crankshaft.

An advantage of the integrally formed balance weight on a crankshaft is that there are no retention problems. There are several disadvantages however and amongst these are:

a. High initial die cost and short die life on the forming apparatus used.

b. Excessive engine bulk due to difficulty in making economic use of the space available for placing the balance weight. The space between the connecting rod and the adjacent side face of the balance weight which overhangs the connecting rod bearing could be occupied by balancing mass were it not for the fact that the bearing is then inaccessible for grinding.

c. An excessively large billet is required to form the more intricate shape and more material has to be removed during subsequent forming. In addition, steel suitable for crankshafts has qualities not required for balance weights for which little more than mass is required.

These disadvantages may be overcome by the use of separate balance weights which can be attached to the crankshaft. A major disadvantage of this approach is retention of the balance weights at high speed. Solutions to the retention problem have hitherto been costly in terms of time, machining accuracy, and the special standard of fixings necessary. Also a high standard of inspection is required during manufacture and final assembly. Balance weights may be attached by welding, but hitherto proposed welding methods have the disadvantage that heating and cooling of the crankshaft causes distortion.

According to the present invention, there is provided a method of attaching balance weights to web portions of a crankshaft, comprising the steps of providing, on the balance weights and on the web portions respectively, mutually engageable surfaces each having at least one rectilinear dimension arranged so as to permit electron-beam welding throughout the locus of the said dimension in a direction which is transverse to the general plane of the associated web portion, and positioning and electron-beam welding the balance weights successively with the respective surfaces in mutual engagement.

Further, according to the present invention, there is provided a method of making a crankshaft comprising the steps of forming a crankshaft body with journal portions, crankpin portions and web portions, completing machining of the body, providing primary balance weights and attaching these to at least some of the web portions, balancing the body with the primary balance weights attached, subjecting parts of the body to surface hardening treatment, providing secondary balance weights or trimmer plates of predetermined weight and dimensions, and attaching the secondary balance weights or trimmer plates to the primary balance weights.

Still further, according to the present invention, there is provided a crankshaft body having web portions adapted for attachment thereto of balance weights by means of electron-beam welding, each such web portion having a surface thereon with a rectilinear dimension the locus of which is transverse to the general plane of the web portion for engagement with a complementary surface on a balance weight, such surfaces being disposed in relation to one another so as to permit access to each surface of an electron beam during successive welding operations.

Still further, according to the present invention, there is provided a crankshaft having web portions with primary balance weights attached thereto by means of electron-beam welding, the thickness of the primary balance weights being such as to permit radial access to adjacent journals or crankpins for the purpose of subjecting the journals and/or crankpins to surface hardening treatment and/or to superfinishing.

Embodiments of the invention will now be described by way of example with reference to the drawings of which:

FIG. 4 is an elevation of the crankshaft as seen in the direction of arrow IV in FIG. 3 prior to attachment of the balance weights which are shown in section;

FIG. 5 is an enlarged partial section of line V—V in FIG. 3 on the crankshaft local to a balance weight;

FIG. 6 is a similar view to FIG. 4 on a second embodiment;

Figure 1:
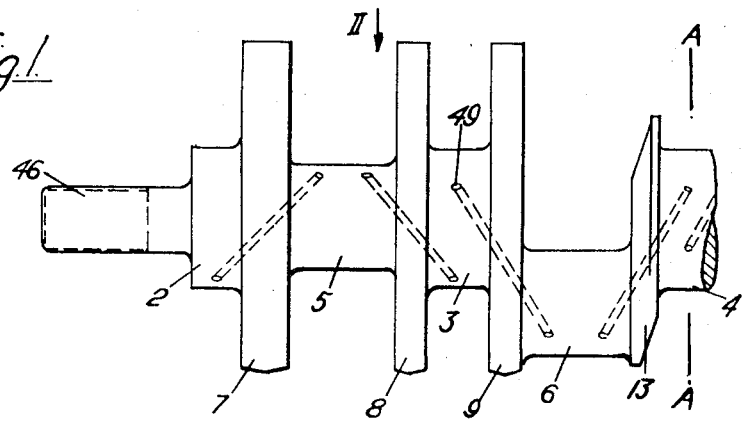
FIG. 1 is an elevation of one half of a crankshaft for a V-8 engine seen in the direction of arrow I in FIG. 2.
Figure 2:
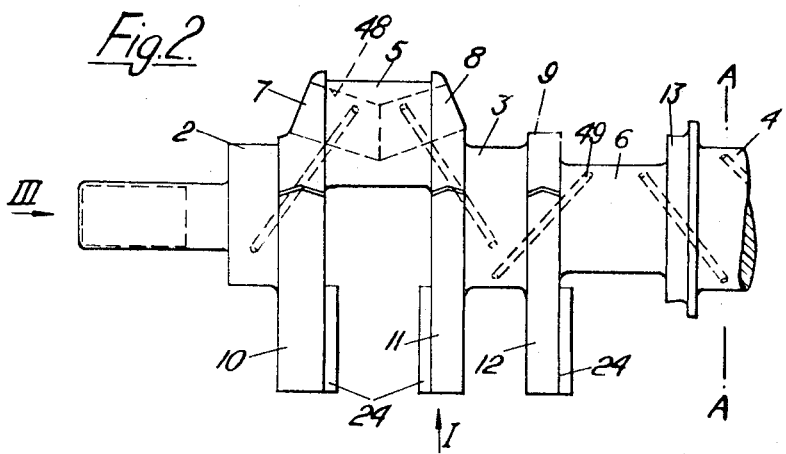
FIG. 2 is a plan of the crankshaft seen in the direction of arrow II in FIG. 1.

In FIGS. 1 to 6, there is shown one half of the length of a crankshaft for a V-8 engine. The other half is asymmetrical to the half shown in all fundamental respects and for the sake of convenience is not illustrated.

A crankshaft 1 has journals constituted by front, intermediate and mid main bearings 2, 3 and 4 respectively, and crank pins 5 and 6 situated at 90° displacement from each other. Webs 7, 8 and 9 flanking the front and intermediate main bearings 2 and 3 carry primary balance weights 10, 11 and 12. A web 13 flanking the mid main bearing 4 has no balance weight. The web 7 and the associated balance weight 10 are heavier than the others.

To attach the primary balance weights to the associated webs of the crankshaft 1, flat surfaces 17, 18 and 19 on webs 7, 8 and 9 are electron beam welded to surfaces 14, 15 and 16 respectively of primary balance weights 10, 11 and 12 across the contiguous mating surfaces.

Each of the balance weights is carefully machined especially in relation to the distances between holes 10a and 10b and the placing of these holes in relation to the surface 14. The distance between the holes 10a and 10b and the sizes of these holes is especially important because they have to match closely with corresponding holes in secondary balance weights or trimmer plates described later herein. The reference numerals 10a and 10b are used in relation to balance weights 10 and it is to be understood that other balance weights have similar holes formed with equal care and accuracy of position.

Reference numeral 20 denotes the electron discharge head of electron beam welding apparatus. In FIG. 4 the surfaces 14, 15 and 16 are stepped outwards from the crankshaft axis; likewise, the surfaces 17, 18 and 19. The discharge head 20 is placed in the plane of surface 19 and aimed at it. Assembly proceeds as follows.

Balance weight 12 is placed in the desired position with its surface 16 abutting surface 19 and the welding apparatus is energized to direct a stream of electrons at the interface 16/19. This causes local melting and fusion of the metals of the crankshaft and balance weight. The electron beam is caused to traverse the interface so that the whole of the abutting surfaces become united.

The discharge head 20 is next aligned with abutting surfaces 18 and 15 and the electron beam welding apparatus is energized and traversed to unite balance weight 11 with web 8. Finally, balance weight 10 is united with web 7 by the same procedure. The same attention is then given to the corresponding three balance weights (not shown) at the other end of the crankshaft. Surface 18 is stepped inwards from surface 19 so that the former does not interfere with the beam to the latter. The beam must be placed on line-of-sight with the surface to be welded. Likewise, surface 17 must not mask the beam from surface 18.

It is preferable that the two abutting surfaces overhang each other by reason that the boundaries of the two surfaces are not the same shape or size. If this is not so then an undercut 23, as shown in FIG. 5, can be provided on the balance weight to ensure an overhang. The overhang ensures that any welding flash produced remains in a recess and no time need be spent in fettling it.

FIG. 6 shows how the surfaces 17a, 18a, 19a and 14a, 15a and 16a can be complementarily angled to allow the discharge head 20 to be positioned so that the electron beam issuing therefrom will clear the other webs or other obstructions.

In the embodiments shown in FIGS. 1–6 the relative traversing of the electron beam and the crankshaft is along a straight path which is a chord of a circle with the axis of the crankshaft as center.

Figure 7:
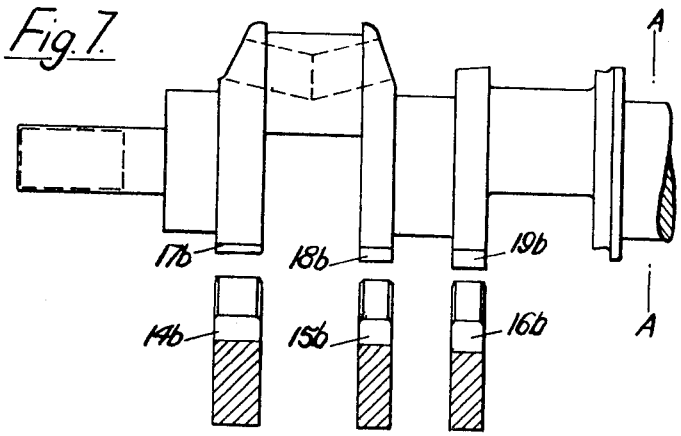
FIGS. 7 and 8 are similar views to FIGS. 3 and 4 of a third embodiment.
Figure 8:
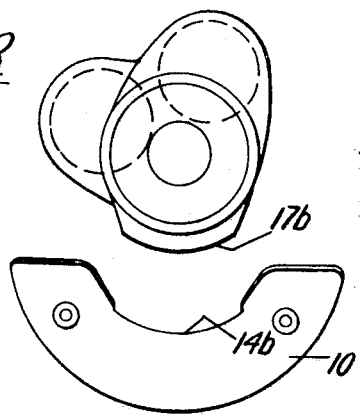

In the embodiment shown in FIGS. 7 and 8 the surfaces 17b, 18b, 19b and 14b, 15b, 16b are cylindrical surfaces. They are stepped slightly to allow unobstructed access of the electron beam as in the case of FIG. 4. If the cylindrical surfaces are angles as in FIG. 6 they necessarily become conical surfaces and the electron discharge head has to be moved accordingly.

Figure 3:
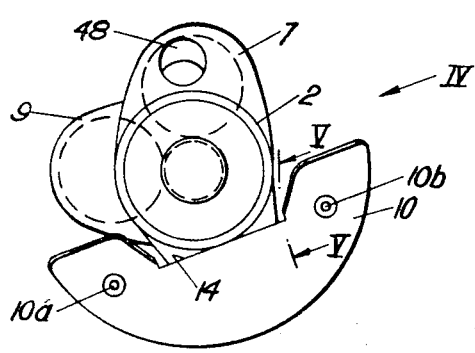
FIG. 3 is an end view of the crankshaft up to the midplane A—A as seen in the direction of arrow III in FIG. 2.
Figure 9:
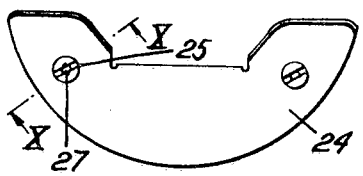
FIG. 9 is a view on section IX—IX in FIG. 10 of a balance weight with a trimmer plate attached.
Figure 10:
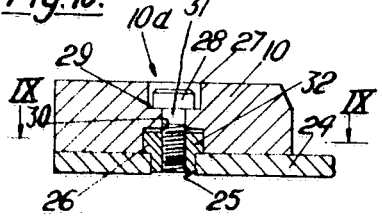
FIG. 10 is a section on line X—X in FIG. 9 showing how the trimmer plate is attached by one method.
Figure 11:
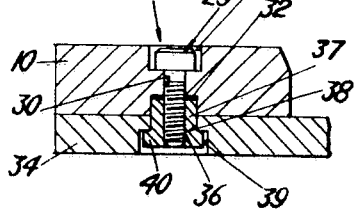
FIG. 11 is a similar section to FIG. 10 showing how the trimmer plate is attached by a second method.

FIGS. 9, 10 and 11 illustrate the secondary balance weights or trimmer plates 24 which are to be fitted to the balance weights to complete the crankshaft, shown in FIG. 1. These preferably have the same shape as the balance weights as seen in FIG. 3.

Two methods of attachment of the trimmer plates are illustrated in FIGS. 10 and 11. Both these methods provide that there will be a mimimum of local distortion adjacent to the fastening means thereby minimizing the imposition of undesirable stresses on the fastening means.

In FIG. 10 there is shown a relatively thin trimmer plate 24 which has a pair of holes 25 formed in it, at the same spacing within close tolerances as the holes 10a and 10b referred to previously. A stepped insert 26 is fitted closely within hole 25 and is electron beam welded to the trimmer plate 24 around the periphery of the hole 25. The insert 26 is threaded internally. The hole 10a is a stepped hole the larger diameter portion 27 being such as to receive the socket head 28 of a set screw 29, the shank 31 of which passes through the smaller diameter portion 30 of hole 10a. A recess 32 is provided to receive the insert 26 in closely fitting engagement in the manner of a dowel. The insert thus constitutes an internally threaded dowel and two of them locate the trimmer plate 24 against lateral movement relative to the balance weight 10.

It will be understood that the electron beam welding of the insert 26 to the trimmer plate permits accuracy of alignment of the dowel to be maintained during the welding process, an advantage that cannot be guaranteed without expensive jigging with other forms of welding. Furthermore, the strength of the insert 26 in shear is relatively unchanged before and after welding, it being understood that the insert is a very highly stressed part.

In FIG. 11 a relatively thicker trimmer plate 34 is shown attached to the balance weight 10. The balance weight is drilled in exactly the same manner as in FIG. 10 and the same reference numerals identify the same parts. In this case, however, the insert 36 has a portion 37 which fits closely in the recess 32 and in a hole 38 in the trimmer plate 34. A recess 39 in the outer side of the trimmer plate 34 receives a flange 40 on the insert 36 which serves, with the set screw 29, to prevent separation of the trimmer plate from the balance weight 10. The insert 36 in this case functions as a loose dowel.

An important feature of the invention is that the dowel holes on the balance weights and trimmer plates can be formed prior to any welding and can be relied upon to be useable as dowel locations after welding.

The method of making a crankshaft calls for the first step of machining the forging. Thus the main bearings 2, 3, 4, etc., crankpin bearings 5, 6 etc., front and rear ends 46 etc., lightening holes 48, oilways 49 and the surfaces 17, 18, 19 etc. are all completed to their proper dimensions and finish so that the crankshaft does not have to return to any machine tool for subsequent metal removal. The next step is to electron beam weld the balance weights in position. This does not involve widespread dispersal of heat in the crankshaft so that there is no distortion such as would cause a requirement for re-machining. Following this, the crankshaft is balanced. This step involves the addition of temporary weights to the crankpins. The temporary weights in this case compensate for part of the total out of balance. The actual balancing is carried out in known manner by removing mass from appropriate parts of the crankshaft.

After balancing, the crankshaft is in a state where the securing of a set of trimmer plates will place it in a desired state of balance for the engine. Before securing the trimmer plates however, the crankshaft bearing surfaces undergo heat treatment to harden them. Depending upon the type of heat treatment, the bearing surfaces may subsequently be cleaned and polished to remove any surface deposits on the bearing. Then the trimmer plates are fitted and the crankshaft is complete, ready for fitting to an engine.

It is often the case that an engine is designed so that the cylinder block can be bored to one of several alternative possible sizes to give two or three capacity sizes of engines having correspondingly different piston weights. The crankshafts of such engines are of the same basic dimensions and are in all respects, except balance, identical. The present invention enables a basic crankshaft with balance weights to be made and balanced so that all that is required subsequently is to fit the set of trimmer plates appropriate to the reciprocating mass of the engine in which the crankshaft is to be fitted. Each trimmer plate is, of course, carefully weighed and tested as to the position of its center of gravity to ensure compatibility with its fellows in the set and with the crankshaft.

Thus the present invention enables complete machining of the crankshaft at a time when no regard need be paid to the problem of balance weights which overhang the crankpins or main bearings; furthermore, no remachining is necessary following the welding of the balance weights. Also the screw-secured weights are attached with the screw axes parallel with the crank axis and the screws are relieved of the shear loads which are carried by the dowels. This makes for greater safety than the use of radial screws which have been used hitherto. Also the weight to be retained by screw means is a fraction of the total balance weight instead of the whole of it as has been proposed hitherto.

The problem of balance weights is particularly acute with a V-8 crankshaft in which each crank pin carries two connecting rods and the invention has been described with reference to such a crankshaft. It will be appreciated that the invention can be used to solve similar problems in connection with engines of different configuration.

I claim:

1. A crankshaft having web portions, primary balance weights attached to the web portions, secondary balance weights each detachably secured to a side of one of said primary balance weights so as to overhang an adjacent journal said secondary balance weight secured to its associated primary balance weight by fastening means and including an insert intermediate said secondary balance weight and said fastening means for aligning said secondary balance weight relative to said primary balance weight.

* * * * *